United States Patent [19]

Nussbaum et al.

[11] Patent Number: 4,881,996

[45] Date of Patent: Nov. 21, 1989

[54] SPLICE ADHESIVE FOR EDPM ROOFING AND SPLICING METHOD EMPLOYING SAME

[75] Inventors: Stephanie Nussbaum, Orrville; Roger L. Streets, Ashland, both of Ohio

[73] Assignee: Ashland Oil, Inc., Russell, Ky.

[21] Appl. No.: 158,416

[22] Filed: Feb. 22, 1988

[51] Int. Cl.$^4$ ............................. B31F 5/00; C09J 5/00
[52] U.S. Cl. .................................. 156/157; 156/333; 524/505; 524/526; 525/96; 525/98
[58] Field of Search ................ 156/157, 333; 524/505, 524/526; 525/96, 98

[56] References Cited

U.S. PATENT DOCUMENTS

| 887,594 | 3/1984 | Miller | 525/333 |
|---|---|---|---|
| 3,935,893 | 2/1976 | Stang et al. | 524/505 |
| 3,819,552 | 6/1974 | Glanville et al. | 524/526 |
| 3,984,369 | 10/1976 | Harlan et al. | 524/505 |
| 4,501,842 | 2/1985 | Chmiel | 524/432 |
| 4,640,730 | 2/1987 | Streets | 156/334 |
| 4,742,119 | 5/1988 | Close | 524/526 |

OTHER PUBLICATIONS

Skiest, Handbook of Adhesives, 1977 pp. 262-270.
Kraton Brochure SC 68:82, Shell, p. 2.
Hercules Brochure, 1985, 900, 1260, p. 2.
Interesin Brochure p. 2.
Schenectady, SR 256, Feb. 1977 Brochure.
Hercules Product Data Sheets, Nov. 83, 9, 84.

*Primary Examiner*—John J. Gallagher
*Attorney, Agent, or Firm*—Mary E. Picken; Vernon F. Venne; David L. Hedden

[57] ABSTRACT

This invention relates to a splice adhesvie for use with elastomeric substrates such as EPDM roofing materials and a method for splicing elastomeric substrates using splice adhesives. The splice adhesive of this invention combines halogenated pre-crosslinked isobutylene-isoprene copolymer butyl rubber, thermoplastic copolymer, hydrocarbon resin, quinoid cure mixture and solvent in a single formulation which is storage stable.

8 Claims, No Drawings

SPLICE ADHESIVE FOR EDPM ROOFING AND SPLICING METHOD EMPLOYING SAME

BACKGROUND OF THE INVENTION

The present invention relates to formulations useful as splice adhesives or as primers for roofing materials made from ethylene-propylene diene monomers (EPDM).

Roofing materials useful for covering large roof areas are customarily prepared in wide sheets for efficient installation. These wide sheets must be overlapped and spliced together when the roofing sheets are installed to provide uniform surfaces. Overlap splicing is often done under extreme weather conditions and the adhered sections must continue to withstand severe weather at extremes of cold and hot temperatures for many years.

Customarily roofing materials, made from plastic, rubber or ethylene propylene diene monomer (EPDM), have been spliced together on site with neoprene (polychloroprene) based contact adhesives. A well known treatise, the Handbook of Adhesives edited by Irving Skiest, published by Van Nostrand Reinhold Company, 1977 edition, at page 880, recommends the use of neoprene based adhesives on EPDM substrates. Butyl rubber based adhesives containing isocyanates and zinc oxide as the curative components are also commonly used. Another EPDM roofing adhesive is described in U.S. Pat. No. 4,640,730 and combines thermoplastic block copolymer, aromatic hydrocarbon resins, sulfur and zinc oxide.

EPDM membranes are a very popular form of single ply roofing. Often they are treated with talc, mica, or cellulosic powders to improve processing and handling of the finished membrane. Splice adhesives often adhere poorly to these treated surfaces.

The adhesives customarily used with EPDM materials, neoprene (chloroprene) adhesive and conventional butyl rubber adhesives, have some deficiencies. The neoprene adhesives may require pre-treatment of the EPDM material with an isocyanate-containing primer or with another primer such as that described in commonly assigned U.S. Pat. application Ser. No. 06/887,594 which provides a primer containing thermoplastic block copolymer, halogenated butyl rubber, aromatic hydrocarbon reinforcing resin, diphenyl quanidine secondary accelerator and solvent. This primer is used in conjunction with neoprene adhesives. The butyl rubber adhesives typically include an isocyanate component within the butyl rubber formulation. U.S. Pat. No. 4,501,842 (Uniroyal, Inc.) describes such an isocyanate-containing butyl rubber adhesive for bonding cured EPDM rubber.

Conventional neoprene adhesives exhibit poor water resistance and insufficient long term durability. The butyl rubber adhesives containing isocyanate are less stable on storage and do not perform well when used after storage. As soon as moisture is introduced into the open container the adhesion and long term stability begin to degrade and this trend worsens with continued exposure. Butyl rubber adhesives containing isocyanate show poor building tack, short open time, poor bond strength at elevated temperature and poor brushability across the application temperature range (0° C. to 65° C.) observed on a roofing site. Adhesives requiring pre-treatment of the EPDM substrate with primers are more cumbersome to use than adhesives needing nothing more than their own application.

OBJECT OF THE INVENTION

It is accordingly an object of this invention to provide an adhesive for cured EPDM roofing materials which does not require pre-treatment of the EPDM material with a primer and which provides good green strength, good water resistance and good long term durability while also showing adequate open time, good bond strength at elevated temperatures and good brushability across wide application temperature ranges.

SUMMARY OF THE INVENTION

In accordance with the present invention an adhesive is provided for EPDM roofing which does not require pretreatment of the roofing material with a primer and does not require the use of isocyanates. The adhesive of this invention provides adequate open time, good green strength, good bond strength at elevated temperatures, good water resistance, good long term durability and good brushability across wide application temperature ranges.

The splice adhesive of this invention does not rely on an isocyanate component for curing but instead contains a novel quinoid cure system having both components, the oxidizing agent and p-quinone dioxime compound contained together within the adhesive formulation, a departure from conventional quinoid cure systems described in the Irving Skiest treatise Handbook of Adhesives, 1977 edition in Chapter 16 at pages 262–264 where the oxidizing agent must be separated from the p-quinone dioxime component until immediately prior to use. In the splice adhesive of this invention both quinoid cure components are within the one pot adhesive, which is storage stable in a closed container for at least six months. "Storage stable" is defined as having a viscosity which does not increase more than 50% over the initial viscosity during six months storage.

In one embodiment this invention relates to an adhesive composition for bonding elastomeric substrates such as cured EPDM comprising a halogenated pre-crosslinked butyl rubber, a thermoplastic copolymer, a resin selected from a thermoplastic hydrocarbon resin, a terpene phenol polymer resin and a pentaerythritol rosin ester resin and a quinoid cure component mixture.

In another embodiment this invention relates to a method for splicing elastomeric substrates comprising the steps of:
(I) applying to said elastomeric substrates an adhesive coating comprising:
 (a) halogenated pre-crosslinked isobutylene-isoprene copolymer butyl rubber,
 (b) thermoplastic copolymer,
 (c) a hydrocarbon resin selected from the group consisting of thermoplastic hydrocarbon resin, terpene phenol polymer resin and polymerized pentaerythritol rosin ester,
 (d) quinoid cure mixture, and
 (e) solvent,
(II) drying said coated substrates, and
(III) joining said dried coated substrates.

DETAILED DESCRIPTION OF THE INVENTION

The first ingredient of the adhesive of this invention is a halogenated pre-crosslinked isobutylene-isoprene copolymer butyl rubber. The halogenated pre-crosslinked butyl rubber may be of the bromobutyl or chlorobutyl type made by Polysar Ltd., Sarnia, Ontario, Canada.

The halogenated pre-crosslinked isobutylene-isoprene copolymer butyl rubber is derived from regular butyl rubber through a proprietary process by incorporating a crosslinking agent during the polymerization of the rubber. The finished product may be schematically represented as follows:

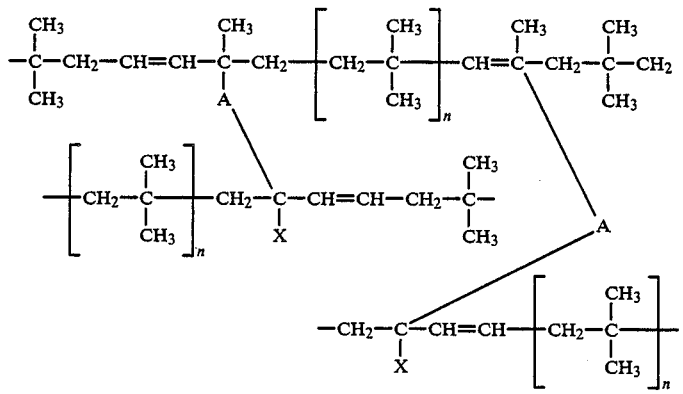

Where X is Cl or Br, n is about 50 and A is a crosslinking agent such as 1,4 divinyl benzene, methyl divinyl benzene, 1,3 butadiene, isoprene, 2-ethyl 1,3-butadiene, 1,6-hexadiene, 1,6 hexanediol-diacrylate, 2 methyl-1, 3-butadiene, butyleneglycol dimethylacrylate, 1,4 butanediol diacrylate, thiodiglycol dimethacrylate, diallyl maleate, decamethylene glycol diacrylate, 2-chloro 1,3 butadiene, polyethylene glycol dimethyacrylate or 1 phenyl ethylene-1,2 dimethacrylate. Not all of the unsaturation is reacted so that part of the butyl rubber is still soluble.

The preferred halogenated pre-crosslinked isobutylene-isoprene copolymer butyl rubber component is the brominated pre-crosslinked isobutylene-isoprene copolymer butyl rubber having 1.0 to 4% bromine, a Mooney viscosity (ML 1+8 at 125° C.) from 60 to 70 as determined by ASTM 1646, a weight average Mw molecular weight from 100,000 to infinity due to crosslinking, available as Polysar XL 40302 pre-crosslinked butyl rubber from Polysar Limited, Sarnia, Ontario, Canada.

The thermoplastic copolymer component of the splicing adhesive of this invention is selected from styrene-butadiene-styrene, styrene-isoprene-styrene, styrene-ethylene-butylene-styrene and styrene-ethylene-propylene-styrene polymers having styrene: rubber ratios from 14:86 to 48:52 or mixtures thereof. The preferred thermoplastic copolymer component is the styrene-ethylene-butylene-styrene copolymer having a styrene: rubber ratio of 29:71 available as Kraton G1652 rubber from Shell Oil Company, Houston, Tex. The thermoplastic copolymer is used at from 5 to 50 parts per 100 parts pre-crosslinked halogenated butyl rubber in the splice adhesive of this invention.

The hydrocarbon resin component of the adhesive of this invention is selected from thermoplastic hydrocarbon resins, terpene phenol polymer resins, and pentaerythritol rosin ester resins. The thermoplastic hydrocarbon resin has a ring and ball softening point from 140° C. to 150° C., a weight average molecular weight Mw from 2800 to 4500, an acid number less than 1, a saponification number less than 1, and a degree of unsaturation shown by an iodine number less than 30 or by a bromine number less than 27 using ASTM D2710. Suitable hydrocarbon resins include Norsolene SP 130 thermoplastic hydrocarbon resin based on impure C9 steamcracker fractions and Norsolene SP 140 thermoplastic hydrocarbon resin based on impure C9 steamcracker fractions, both described in U.S. Pat. No. 4,100,336, available from Interesin, Houston, Tex. and Hercules Picco 5140 thermoplastic hydrocarbon resin based on impure C5-C9 steamcracker fractions available from Hercules Incorporated, Wilmington, Del. The preferred hydrocarbon resin is the Norsolene SP 130 thermoplastic hydrocarbon resin. From 5 to 100 parts hydrocarbon resin are used with 100 parts pre-crosslinked halogenated butyl rubber in the splice adhesive of this invention.

The terpene phenol polymer resin has a weight average molecular weight Mw between 600 and 700, a ring and ball melting point between 146° C. and 156° C. as determined by ASTM E28 and an acid number from 56 to 70 as determined by ASTM D555. SP-560 resin available from Schenectady Chemicals, Inc., Schenectady, N. Y. is the preferred terpene phenol polymer resin and 5 to 100 parts are used with 100 parts pre-crosslinked halogenated butyl rubber in the splice adhesive of this invention.

The thermoplastic polymerized pentaerythritol rosin ester component of the splice adhesive of this invention has a drop softening point between 130° C. and 195° C. Among the preferred polymerized pentaerythritol rosin esters are the pentaerythritol ester of polymerized rosin having a drop softening point of 130° C. to 140° C. and an acid number less than 16 available as Pentalyn C pentaerythritol ester of polymerized rosin from Hercules Incorporated, Wilmington, Del. and the pentaerythritol ester of dimeric resin acids having a drop softening point between 185° C. and 195° C. and an acid number less than 25 available as Pentalyn K pentaerythritol ester of dimeric resin acids also available from Hercules Incorporated.

The quinoid cure component of the splice adhesive of this invention is a mixture of an oxidizing agent such as a metal catalyst complex, for example cobaltous acetyl acetonate, tin acetyl acetonate, or acetyl acetonate complexes of other transition metal ions such as zinc, ferric or zirconium ions and a crosslinking agent selected from the group of para-quinone dioxime, dibenzoyl para-quinone dioxime, dinitrosobenzene and mixtures thereof. In a preferred embodiment of the splice adhesive of this invention 0.5 to 2.0 parts cobaltous acetyl acetonate and 1 to 5 parts dibenzoyl para-quinone dioxime are combined with 100 parts halogenated pre-crosslinked isobutylene-isoprene copolymer butyl rubber, 5 to 50 parts thermoplastic copolymer, 5 to 100 parts hydrocarbon resin and 500 parts solvent.

The quinoid cure component of this splice adhesive provides a different curing mechanism from that in commercial butyl rubber adhesives relying on isocyanate and zinc oxide curing mechanisms. Adhesives containing the quinoid cure component are free of the disadvantages of isocyanate-containing adhesives.

Solvents useful in the splice adhesive of this invention include xylene, cyclohexane, toluene, Lacolene solvent available from Ashland Chemical Company, Columbus, Ohio and mixtures thereof.

The following Examples show how the present invention can be practiced but should not be construed as limiting. In this application, all percentages and proportions are by weight and all units are in the metric system, unless otherwise expressly indicated. Also, all citations herein are expressly incorporated herein by reference.

EXAMPLE 1

This example illustrates the preparation of the roof splice adhesive of this invention. Polysar XL 40302 halogenated pre-crosslinked isobutylene-isoprene copolymer butyl rubber masterbatch crumb in the amount of 108.4 parts containing 5.0 parts Ashland N347 HAF-HS carbon black and 3.4 parts dibenzoyl para-quinone dioxime was added to 1.0 part cobaltous acetyl acetonate (Amspec, Gloucester City, N. J.), 2.0 parts Irganox 1010 antioxidant (Ciba Gergy Corporation, Ardsley, N.Y.), 5.0 parts Indopol H1500 polybutene (Amoco Chemicals Corporation, Chicago, Ill.), 15.0 parts Kraton G1652 thermoplastic crumb styrene-ethylene-butylene styrene (SEBS) block copolymer (Shell Oil Company, Houston, Tex.), 30.0 parts Norsolene SP130 aromatic resin (InteResin Corporation, Houston, Tex.), 5.0 parts 2,4-pentanedione catalyst modifier (Union Carbide Corporation Specialty Chemicals Division, Danbury, Conn.), 25.0 parts xylene, 75.0 parts cyclohexane, 99.8 parts toluene and 299.5 parts Lacolene solvent (Ashland Chemical Company, Columbus, Ohio) in a Meyers type laboratory mixer. The adhesive was mixed for five hours until smooth, was filtered and stored.

EXAMPLE 2

This example illustrates the test procedures used in evaluating the splice adhesive of this invention. Test samples of ethylene propylene diene monomer (EPDM) sheet roofing stock sold by Firestone Building Products, Indianapolis, Ind. under the RubberGard trademark were prepared by washing the surface of 4 inch by 8 inch of 0.045 inch thick pieces with a cloth soaked in Shell Sol B solvent (Shell Oil Company, Houston, Tex.). A uniform adhesive coating was brushed onto the EPDM pieces and allowed to dry 45 minutes at 25° C. T-peel adhesion samples were prepared by joining one entire adhesive coated piece with the adhesive coated side of a second piece, followed by use of a hand roller to form a laminate. The adhesion samples were allowed to stand undisturbed for 24 hours at 25° C. Adhesion testing was then done on an Instron tensile tester with the jaw speed set at 2 inches/minute. Testing was done at 25° C. Samples were also stored in air at 70° C. and in water at 70° C. after the initial 24 hour 25° C. conditioning period. Adhesion testing was then done as described using the Instron tester. Table 1 reports the results achieved using the adhesive of this invention prepared according to the procedure of Example 1. The control shown is the commercially available Uniroyal M 6365 adhesive containing isocyanate described in U.S. Pat. No. 4,501,842.

TABLE 1

| Aging Condition | Testing Condition | Example 1 Adhesive lbs./in | Commercial Adhesive lbs./in |
| --- | --- | --- | --- |
| 24 hr @ RT | RT | 4.1 | 3.9 |
| 7 day @ RT | RT | 6.8 | 4.3 |
| 7 day @ 70° C. | RT | 7.2 | 3.9 |
| 7 day @ 70° C. H$_2$O | RT | 6.2 | 3.5 |
| 7 day @ −9° C. | RT | 3.1 | 3.1 |

EXAMPLE 3

This Example illustrates the effect of using various thermoplastic copolymers in the splice adhesive of this invention. Following the procedure of Example 1 Kraton D1101 polymer (linear styrene-butadiene-styrene SBS), Stereon 840A (random radial styrene-butadiene SBR) and Kraton D1107 (linear styrene-isoprene-styrene SIS) polymers were substituted for the Kraton G1652 polymer in Example 1. The results are reported in Table 2.

TABLE 2

| | | (4692-45) | | | |
| --- | --- | --- | --- | --- | --- |
| Aging Condition | Testing Condition | \multicolumn{4}{c}{LBS/in} | | | |
| | | SEBS | SBS | SBR | SIS |
| 24 hr @ RT | RT | 4.5 | 4.5 | 4.3 | 4.1 |
| 3 day @ RT | RT | 7.0 | 7.9 | 7.0 | 6.7 |
| 7 day @ RT | RT | 7.1 | 6.9 | 7.0 | 6.5 |
| 24 hr @ 70° C. | RT | 3.1 | 2.1 | 1.8 | 1.7 |
| 3 day @ 70° C. | RT | 3.9 | 3.5 | 2.3 | 2.5 |
| 7 days @ 70° C. | RT | 4.6 | 4.5 | 3.5 | 3.6 |

EXAMPLE 4

This Example illustrates the effect of using various hydrocarbon resins in the splice adhesive of this invention. Following the procedure of Example 1 the Norsolene SP 130, Norsolene SP 140 and Picco 5140 thermoplastic hydrocarbon resins, the Schenectady SP-560 terpene phenol polymer resin and the Pentalyn C and Pentalyn K polymerized pentaerythritol rosin ester resins were compared. The results are reported in Table 3.

TABLE 3

| | | (4692-46) | | | | |
| --- | --- | --- | --- | --- | --- | --- |
| Aging Condition | Testing Contion | SP 130 | SP 140 | Picco 5140 | SP 560 | Pentalyn C K |
| 24 hr @ RT | RT | 4.5 | 4.4 | 4.5 | 4.4 | 4.6 3.9 |
| 7 day @ RT | RT | 6.0 | 6.0 | 5.6 | 8.1 | 6.4 6.5 |
| 24 hr @ 70° C. | RT | — | — | — | 1.9 | 1.6 1.6 |
| 7 day @ 70° C. | RT | 6.7 | 7.2 | 6.5 | 3.9 | 4.0 4.4 |

We claim:

1. An adhesive composition for splicing cured elastomeric substrates together comprising:
   (a) halogenated pre-crosslinked isobutylene-isoprene copolymer butyl rubber,
   (b) thermoplastic copolymer selected from the group consisting of styrene-butadiene-styrene, styrene-isoprene-styrene, styrene-ethylene-butylene-styrene, and styrene-ethylene-propylene-styrene polymers (c) a hydrocarbon resin selected from the group consisting of thermoplastic hydrocarbon resin, terpene phenol polymer resin and polymerized pentaerythritol rosin ester, (d) quinoid cure mixture comprising a metal catalyst complex oxidizing agent and a quinoid crosslinking agent, and (e) solvent, said adhesive being storage stable in a closed container for at least six months.

2. The composition of claim 1 wherein:
(a) is brominated pre-crosslinked isobutylene-isoprene copolymer butyl rubber,
(b) is a thermoplastic copolymer selected from the group of styrene-butadiene-styrene, styrene-isoprene-styrene, styrene-ethylene-butylene-styrene, and styrene-ethylene-propylene-styrene polymers having styrene rubber ratios from 14:86 to 48:52 or mixtures thereof, and
(d) is cobaltous acetyl acetonate and dibenzoyl paraquinone dioxime.

3. The composition of claim 1 wherein:
(a) is 100 parts,
(b) is from 5 to 50 parts,
(c) is from 5 to 100 parts, and
(d) is from 1 to 10 parts.

4. The composition of claim 1 wherein:
(a) is 100 parts,
(b) is 15 parts,
(c) is 30 parts, and
(d) is 4 to 5 parts.

5. A method of splicing unprimed, cured elastomeric substrates together comprising the steps of:
(I) applying to said elastomeric substrates an adhesive coating composition comprising:
(a) halogenated pre-crosslinked isobutylene-isoprene copolymer butyl rubber,
(b) thermoplastic copolymer selected from the group consisting of styrene-butadiene-styrene, styrene-isoprene-styrene, styrene-ethylene-butylene-styrene, and styrene-ethylene-propylene-styrene polymers
(c) a hydrocarbon resin selected from the group consisting of thermoplastic hydrocarbon resin, terpene phenol polymer resin and polymerized pentaerythritol rosin ester,
(d) quinoid cure mixture comprising a metal catalyst complex oxidizing agent and a quinoid crosslinking agent, and
(e) solvent, said adhesive composition being storage stable in a closed container for at least six months,
(II) drying said coated substrates, and
(III) joining said dried coated substrates.

6. The method of claim 5 wherein:
(a) is brominated pre-crosslinked isobutylene-isoprene copolymer butyl rubber,
(b) is a thermoplastic copolymer selected from styrene-butadiene-styrene, styrene-isoprene-styrene, styrene-ethylene-butylene-styrene, and styrene-ethylene-propylene-styrene, polymers having styrene: rubber ratios from 14:86 to 48:52 or mixtures thereof, and
(d) is cobaltous acetyl acetonate and dibenzoyl paraquinone dioxime.

7. The method of claim 5 wherein:
(a) is 100 parts,
(b) is from 5 to 50 parts,
(c) is from 5 to 100 parts, and
(d) is from 1 to 10 parts.

8. The method of claim 5 wherein (a) is 100 parts, (b) is 15 parts, (c) is 30 parts and (d) is 4 to 5 parts.

* * * * *